US006201554B1

(12) United States Patent
Lands

(10) Patent No.: US 6,201,554 B1
(45) Date of Patent: Mar. 13, 2001

(54) DEVICE CONTROL APPARATUS FOR HAND-HELD DATA PROCESSING DEVICE

(75) Inventor: Robert M. Lands, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/234,538

(22) Filed: Jan. 12, 1999

(51) Int. Cl.[7] .................... G09G 5/00

(52) U.S. Cl. .................... 346/169; 345/156; 345/173; 345/901

(58) Field of Search .................... 345/169, 156, 345/157, 158, 168, 173, 179, 901

(56) References Cited

U.S. PATENT DOCUMENTS 4,839,838 * 6/1989 LeBiche et al. .................... 345/157
5,059,958 * 10/1991 Jacobs et al. .................... 345/158
5,602,566 2/1997 Motosyuku et al. .................... 345/123

OTHER PUBLICATIONS

Abstract of "Hand–held Image Display for e.g. Hand–held Computer or Electronic Diary in Which Sensor Responds to Angle of Tilt of Display, Such That Display Portion to be Displayed is Controlled by Varying Angle of Inclination of Device" Stove AG.

"Control System for Computer Using Attitude Sensing Uses Variable Attitude Data, Pret. Obtained From Array of Mercury Switches to Control Image on Screen" Abstract, Walker PJM.

* cited by examiner

*Primary Examiner*—Dennis-Doon Chow
(74) *Attorney, Agent, or Firm*—Wood, Phillips, VanSanten, Clark & Mortimer

(57) ABSTRACT

A portable display device is provided having a size suitable for hand-held use and including a display screen for displaying video images and audio circuitry for providing audio signals to a user thereof. A manual input device is mounted on the portable display device and is activatable by a user for placing the portable display device in any one of a plurality of modes of operation selected from the group consisting of paging, volume control, brightness control and zoom. A sensor, also mounted on the portable display device, is configured to sense changes in tilt of the portable display device relative to a reference tilt established upon placing the portable display device in one of the plurality of modes of operation. A control is connected to the sensor and is adapted to modify parameters associated with a mode of operation selected from the plurality of modes of operation in response to the sensor sensing tilt changes when the portable display device is in the selected mode of operation.

46 Claims, 4 Drawing Sheets

DEVICE CONTROL APPARATUS FOR HAND-HELD DATA PROCESSING DEVICE

FIELD OF THE INVENTION

The present invention is directed toward hand-held data processing devices, and more particularly, toward conveniently controllable hand-held data processing devices.

BACKGROUND OF THE INVENTION

Small hand-held data processing devices with display screens are becoming increasingly more common in a wide variety of uses. For example, small hand-held computers commonly called "personal assistants" or "palm held computers" are currently available. Typically, the small hand-held computers have associated with them small display screens. Similarly, communicators having both cellular communication and computer capabilities are available, typically having small display screens. These small, portable devices do not, and cannot, conveniently have conventional input devices, such as a computer mouse and other control buttons/knobs. Therefore, conventional personal computer interfaces, which also have their own problems, are not suited for these small portable devices.

As a result, there are significant limitations on using such small portable devices in both obtaining output, e.g., viewing data on the display screen, and in inputting commands, e.g., changing the area viewed on the display screen or controlling the performance of a particular parameter associated with the device. Further, given the limited area available, not only on the display screen but also on the entire device, adding additional control buttons/knobs, etc., is both difficult and burdensome to a user requiring two hand operation of the device.

The present invention is directed toward overcoming one or more of the above-identified problems.

SUMMARY OF THE INVENTION

A portable display device is provided having a size suitable for hand-held use and including a display screen for displaying video images and audio circuitry for providing audio signals to a user thereof. A manual input device is mounted on the portable display device and is activatable by a user for placing the portable display device in any one of a plurality of modes of operation selected from the group consisting of paging, volume control, brightness control and zoom. A sensor, also mounted on the portable display device, is configured to sense changes in tilt of the portable display device relative to a reference tilt established upon placing the portable display device in one of the plurality of modes of operation. A control is connected to the sensor and is adapted to modify parameters associated with a mode of operation selected from the plurality of modes of operation in response to the sensor sensing tilt changes when the portable display device is in the selected mode of operation.

The manual input device generally includes pushbutton switches depressible a first time to activate a particular mode of operation, and depressible a second time to deactivate the particular mode of operation. Preferably, the pushbutton switches are mounted at locations on the portable display device engageable by a finger of a user with the portable display device held in the hand of the user.

The sensor is also configured to sense changes in tilt direction of the portable display device relative to the reference tilt, and to develop a signal indicative of the sensed change in tilt direction. The control is adapted to further modify parameters associated with the selected mode of operation in response to the signal from the sensor indicative of tilt direction changes.

In one form, the portable display device displays windows of video data on the display screen. With the portable display device in the paging mode, the control circuit pages through the windows on the display screen, one at a time, in response to the signal from the sensor indicative of changes in tilt and tilt direction. The paging is performed at a rate proportional to the change in tilt of the portable display device from the reference tilt. The control is configured to page forward through the windows on the display screen, one at a time, with the portable display device tilted in a first direction, and to page backward through the windows on the display screen, one at a time, with the portable display device tilted in a second direction different from the first direction. The window appearing on the display screen upon deactivation of the portable display device from the paging mode remains on the display screen.

In another form, with the portable display device in the volume control mode, the control is configured to control a level of volume of the audio signals developed by the audio circuitry in response to the signal from the sensor indicative of changes in tilt and tilt direction. The volume level of the audio signals is changed by an amount proportional to the change in tilt of the portable display device from the reference tilt. The control is configured to increase the volume level of the audio signals with the portable display device tilted in a first direction, and to decrease the volume level of the audio signals with the portable display device tilted in a second direction different from the first direction. The volume level of the audio signals upon deactivation of the portable display device from the volume control mode defines a new volume level of the audio signals.

In yet another form, with the portable display device in the brightness control mode, the control is configured to control a level of brightness of the display screen in response to the signal from the sensor indicative of changes in tilt and tilt direction. The brightness level of the display screen is changed by an amount proportional to the change in tilt of the portable display device from the reference tilt. The control is configured to increase the brightness level of the display screen with the portable display device tilted in a first direction, and to decrease the brightness level of the display screen with the portable display device tilted in a second direction different from the first direction. The brightness level of the display screen upon deactivation of the portable display device from the brightness control mode defines a new brightness level of the display screen.

In still another form, with the portable display device in the zoom mode, the control is configured to control zooming on content displayed on the display screen in response to the signal from the sensor indicative of changes in tilt and tilt direction. The zooming on content displayed on the display screen is changed by an amount proportional to the change in tilt of the portable display device from the reference tilt. The control is configured to zoom in on content displayed on the display screen with the portable display device tilted in a first direction, and to zoom out on content displayed on the display screen with the portable display device tilted in a second direction different from the first direction. The zoomed content displayed on the display screen upon deactivation of the portable display device from the zoom mode remains displayed on the display screen.

It is an object of the present invention to provide a data processing device capable of convenient use and control.

It is a further object of the present invention to provide a data processing device capable of one hand use and control.

Other aspects, objects and advantages of the present invention can be obtained from a study of the application, the drawings, and the appended claims.

DETAILED DESCRIPTION OF THE PREFERRED EMBODIMENT

Figure 1:
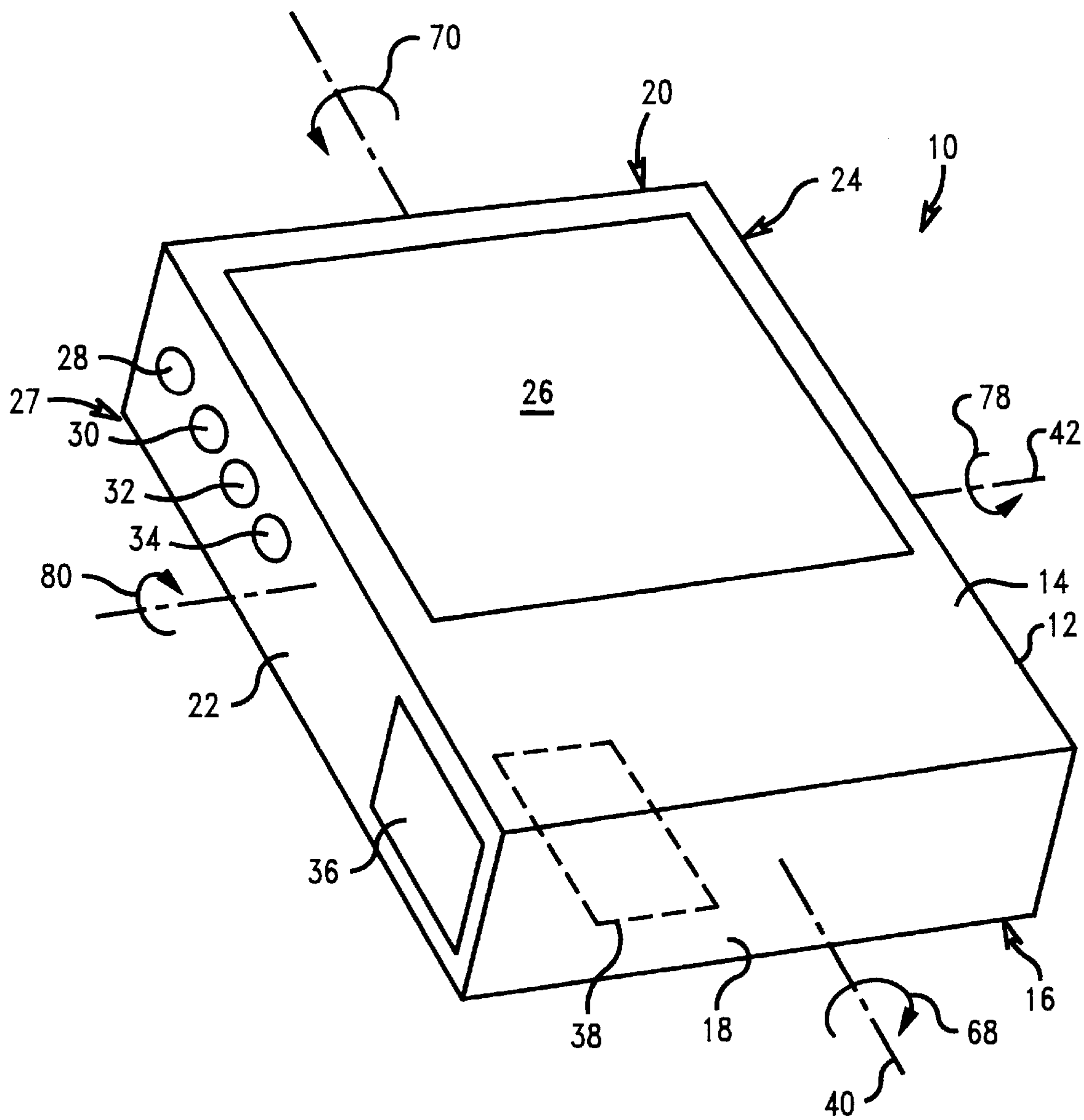
FIG. 1 is a perspective view of a hand-held data processing device according to the present invention.

FIG. 1 illustrates a portable hand-held data processing device according to the present invention, shown generally at 10. In the illustrated embodiment, the hand-held device 10 is a hand-held/palm computer. The hand-held device 10 includes a housing 12 having a top 14 and a bottom 16, a front 18 and a back 20, and a left side 22 and a right side 24. A display screen 26 for displaying video information is mounted at the top 14.

Plural manual input devices 27 are located on the left side 22 of the housing 12 for controlling certain operation of the hand-held device 10. The manual input devices 27 include four control buttons for activating/deactivating four modes of operation of the hand-held device 10. More specifically, a first button 28 is provided for activating/deactivating a paging mode of operation; a second button 30 is provided for activating/deactivating a volume control mode of operation; a third button 32 is provided for activating/deactivating a brightness control mode of operation; and a fourth button 34 is provided for activating/deactivating a zoom mode of operation. While the buttons 28,30,32,34 are illustrated in FIG. 1 as disposed on the left side 22 of the housing 12, the buttons 28,30,32,34 may be disposed on the housing 12 at any location generally engageable by a finger of a user when the device 10 is held in a hand of the user.

First 36 and second 38 sensors are attached to the housing 12. The sensors 36,38 are preferably gravitational accelerometers which respond to an angle of tilt of the device 10. The angle of tilt is formed by the device 10 and a line in the direction of gravity. The first sensor 36 is a single-axis accelerometer attached to the left side 22 of the housing 12 and having a plane defined by the left side 22 of the housing 12. The second sensor 38 is a dual-axis accelerometer attached to the bottom surface 16 of the housing 12 and having a plane defined by the bottom surface 16 of the housing 12. One skilled in relevant art will appreciate that other sensor/accelerometer attachment orientations may be implemented, while keeping the planes of the sensors/accelerometers orthogonal, without departing from the spirit and scope of the present invention. Further, one skilled in the relevant art will appreciate that various pluralities of sensors/accelerometers may be implemented without departing from the spirit and scope of the present invention. As will be described in greater detail infra, various parameters associated with the hand-held device 10 are generally controllable by tilting/rotating the hand-held device 10 about axes 40 and/or 42.

Figure 2:
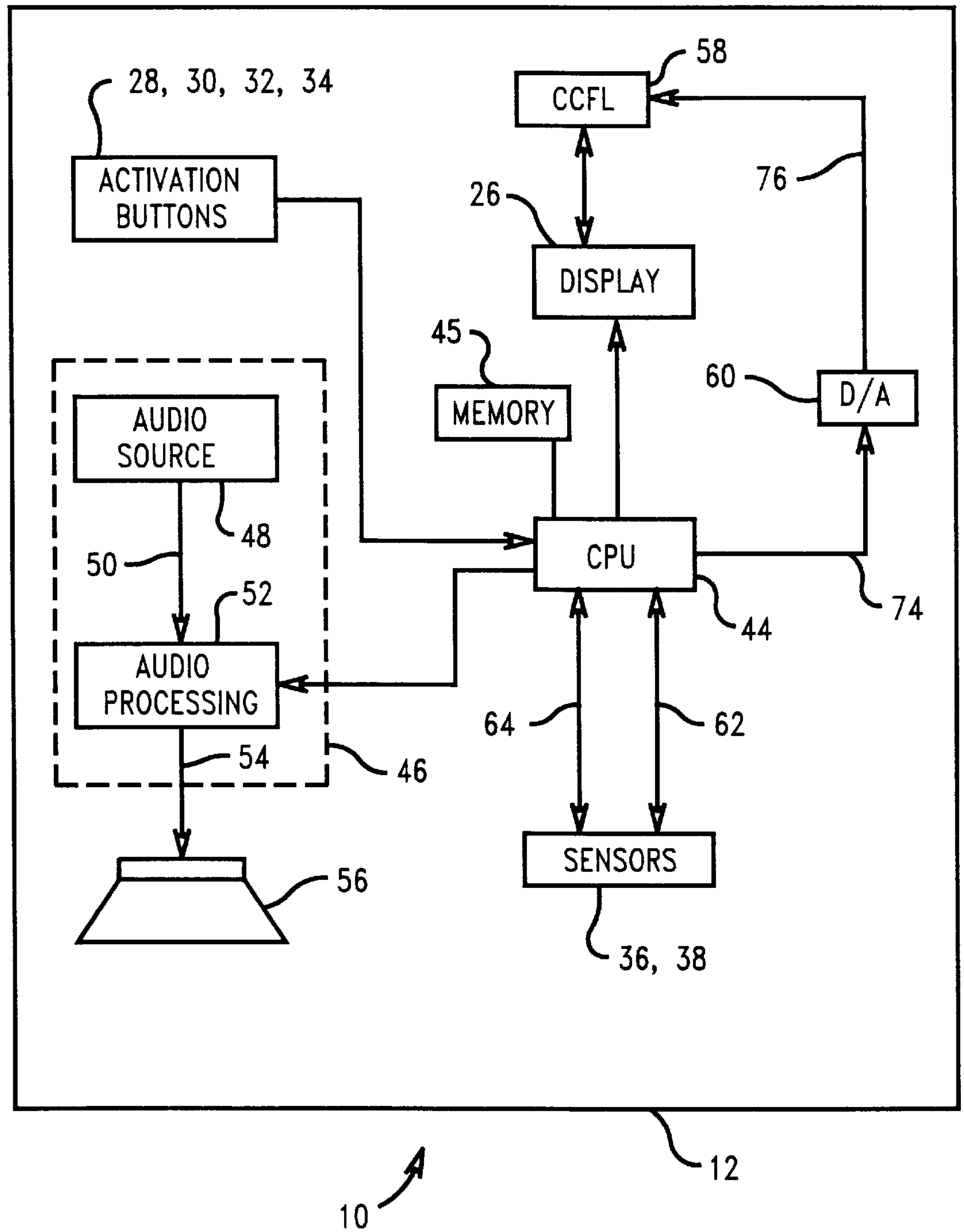
FIG. 2 is a block diagram illustrating the components resident within, or attached to, the hand-held device shown in FIG. 1.

FIG. 2 is a block diagram illustrating the various components resident within, or attached to, the housing 12 of the hand-held device 10. The hand-held device 10 includes a control circuit (CPU) 44 controlling operation of the hand-held device 10. The CPU 44 includes a memory 45 for storing various software and application programs capable of being utilized by the hand-held device 10. Conventional audio circuitry 46 is included within the housing 12 for providing audio features e.g., voice signals, alarms, etc., to a user of the hand-held device 10. The audio circuitry 46 includes an audio source 48, which may include an embedded cellular telephone, a PSTN interface, an AM/FM radio, etc., producing an audio signal on a line 50. An audio processing circuit 52 processes the audio signal and develops a processed audio signal on a line 54 which is conventionally applied to a speaker 56.

The display 26 is preferably a backlit liquid crystal display (LCD). The brightness level of the display 26 is controlled by the CPU 44 by adjusting the current flowing in a Cold Cathode Fluorescent Lamp (CCFL) circuit 58, via a digital-to-analog (D/A) converter 60.

Various modes of operation, including paging, volume control, brightness control and zooming, are controlled in accordance with the invention by tilting/rotating the hand-held device 10 about axes 40 and/or 42 (see FIG. 1). Both the angle of tilt of the device 10 relative to a reference tilt, and the direction of tilt of the device 10 are sensed by the sensors 36 and 38 which develop and transmit signals on lines 62 and 64 indicative of both the angle and direction of tilt of the device 10. The reference tilt is established upon activation of a particular mode of operation. The signals on lines 62 and 64 are received by the CPU 44, which is programmed to adjust a particular parameter associated with the activated mode of operation in response thereto, with the level, or rate, of adjustment to the particular parameter proportional to the change in tilt of the hand-held device 10 from the reference tilt as sensed by the sensors 36 and 38.

The control buttons 28,30,32,34 are preferably pushbutton switches depressible a first time to place the hand-held device 10 in a particular mode of operation, and depressible a second time to deactivate the particular mode of operation. While the hand-held device 10 is in a particular mode of operation, a parameter associated with that particular mode of operation can be modified/adjusted by tilting the hand-held device 10 at various tilts relative to the reference tilt. The level of the particular parameter being modified present upon deactivation of the hand-held device from the particular mode of operation defines a new level for that particular parameter.

Figure 3:
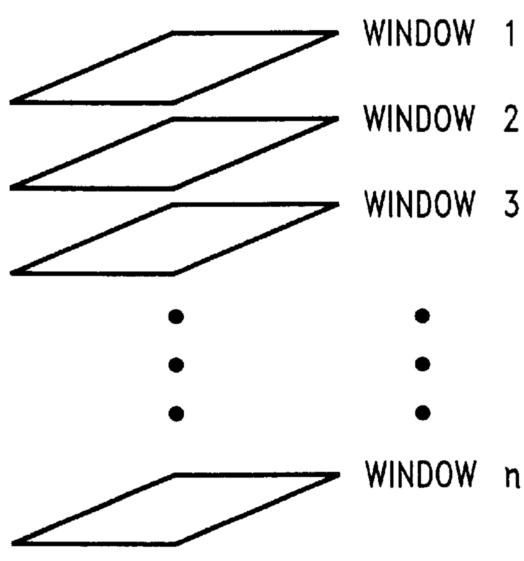
FIG. 3 illustrates the conceptual stackup of window displays in the hand-held device according to the present invention.

Referring to FIGS. 1–4, the paging mode of operation will now be described. Typically, the video information displayed on the display screen 26 is displayed in the form of windows. The windows could be pages of a document or pages from different applications, such as a word processing program and a spreadsheet. Further, a situation may arise where one window is a word processing document and another is video from a DVD drive or possibly a TV. Conceptually, it is convenient to visualize the various windows stacked on top of one another as shown in FIG. 3. In the prior art, paging through the windows 1-n is done by storing the windows behind buttons/icons, as in the case of a Microsoft windows environment, or by cascading the windows behind each other with a portion of each window being accessible by a cursor. In this manner, a particular window can be selected by placing the cursor on the icon, button or window and selecting the particular window. The particular window then opens up and takes over a portion of the screen for use. This generally requires the use of a computer mouse which is difficult to implement and utilize on small, portable hand-held devices.

Figure 4A:
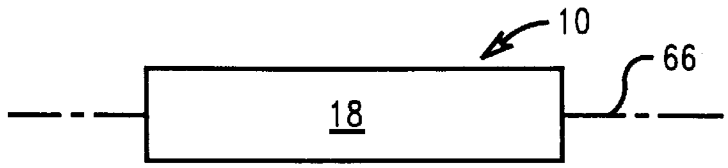
FIGS. 4A–4E are explanatory diagrams illustrating orientation of the hand-held device for controlling operating parameters associated therewith.
Figure 4B:
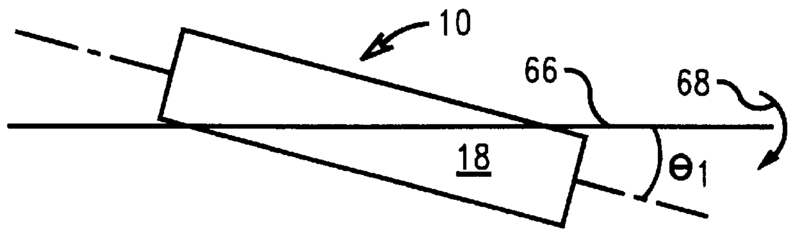
Figure 4C:
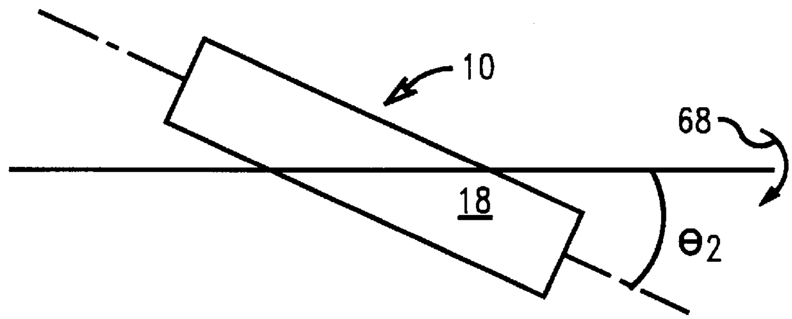

As shown in FIGS. 4A–4E, paging through the various windows 1-n can be accomplished by simply tilting the hand-held device 10. FIG. 4A illustrates an exemplary orientation of the hand-held device 10 upon the first control button 28 being depressed to place the hand-held device 10 in the paging mode. Upon activation of the paging mode by depressing the control button 28, a reference plane/tilt 66 as sensed by the sensors 36,38 is established. The reference tilt 66 is defined by the orientation of the hand-held device 10, horizontal or otherwise, upon activation of a particular mode of operation, e.g., paging. FIG. 4B illustrates the hand-held device 10 tilted about the axis 40 in a first direction 68 at a first angle $\theta_1$ from the reference tilt 66. The angle of tilt $\theta_1$ is sensed by the sensors 36,38 which transmit signals 62,64 to the CPU 44 indicative of the change in tilt $\theta_1$ of the hand-held device 10 from the reference tilt 66 in the first direction 68. In response to the signals 62 and 64, the CPU 44 controls forward paging through the windows 1-n, one at a time, at a first rate proportional to the angle of tilt $\theta_1$ of the hand-held device 10. Further tilting of the hand-held device 10 in the first direction 68 to an angle $\theta_2$ ($\theta_2>\theta_1$) from the reference tilt 66, as shown in FIG. 4C, is sensed by the sensors 36,38. The signals 62,64 developed/transmitted by the sensors 36,38 are indicative of the change in tilt $\theta_2$ of the hand-held display 10 from the reference tilt 66 in the first direction 68. In response, the CPU 44 controls forward paging through the windows 1-n, one at a time, at a second rate proportional to the angle of tilt $\theta_2$ of the hand-held device 10. Thus, the rate of forward paging through the windows 1-n, one at a time, may be controlled by simply varying the angle of tilt of the device 10 from the reference tilt 66 in the first direction 68. Increasing the angle of tilt of the device 10 in the first direction 68 increases the rate of the forwarding paging through the windows 1-n, one at a time.

Figure 4D:
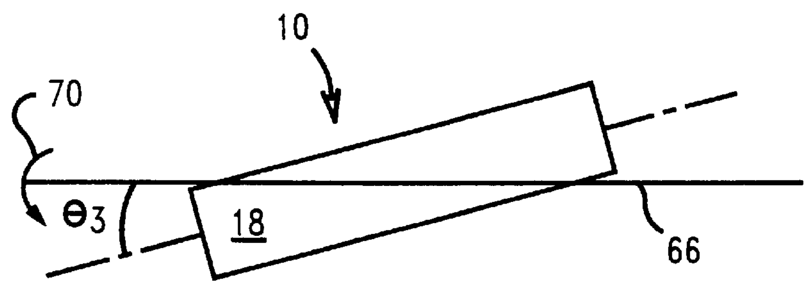
Figure 4E:
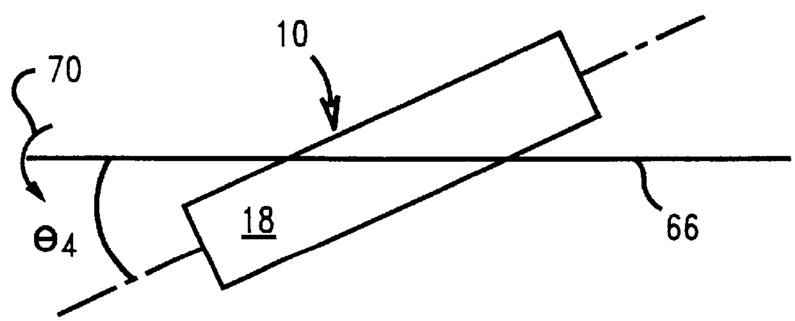

Backward paging through the windows 1-n is similarly controllable by tilting the hand-held device 10 about the axis 40 in a second direction 70, which is different from the first direction 68. For example, as shown in FIG. 4D, the hand-held device 10 is tilted in the second direction 70 at an angle $\theta_3$ from the reference tilt 66. Both the angle of tilt $\theta_3$ and the direction 70 are sensed by the sensors 36,38 in the manner as previously described. With the orientation of the hand-held device 10 in the position as shown in FIG. 4D, backward paging through the windows 1-n occurs at a first rate proportional to the angle of tilt $\theta_3$. Further tilting of the hand-held device 10 in the second direction 70 to an angle $\theta_4$ ($\theta_4>\theta_3$) from the reference tilt 66, as shown in FIG. 4E, increases the rate of backward paging in the same manner as previously described with respect to forward paging. Deactivation of the hand-held device 10 from the paging mode is performed by depressing the first control button 28 a second time. Upon deactivation, the window appearing on the display screen 26 remains.

Figure 5A:
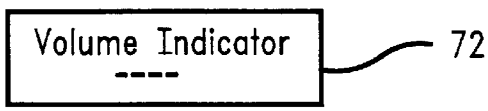
FIGS. 5A–5D are explanatory diagrams illustrating control of volume level associated with the hand-held device according to the present invention.
Figure 5B:

Control of the other parameters associated with the other modes of operation (volume control, brightness control, zooming) is performed in the same manner as previously described with respect to paging. FIGS. 5A–5D illustrate control of the volume level associated with the hand-held display 10. Upon the second control button 30 being depressed to place the hand-held device in the volume control mode, a volume indicator window 72 appears on the display screen 26. Upon activation of the volume control mode by depressing the second control button 30, it is assumed that the volume level is as shown in FIG. 5A and the hand-held display 10 is oriented as shown in FIG. 4A. Accordingly, the reference tilt 66 is established. Tilting of the hand-held device 10 about the axis 40 in the first direction 68, as shown in FIG. 4B, is sensed by the sensors 36,38. In response to the signal 62 and 64, which are developed by the sensors 36 and 38 and which are indicative of the change in tilt $\theta_1$ of the hand-held device 10, the CPU 44 controls the audio processing circuitry 52 to increase the volume level of the audio circuitry 46 to a level as shown in FIG. 5B. Further tilting of the hand-held device 10 in the first direction 68 as shown in FIG. 4C results in a further increase in the volume level of the audio circuitry 46 to a level as shown in FIG. 5C.

Figure 5D:
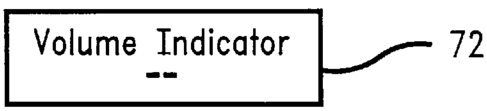
Figure 5C:
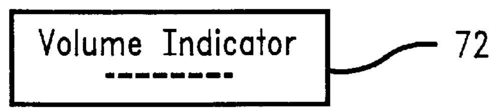

Conversely, rotation of the hand-held device 10 in the second direction 70 as shown in FIG. 4D results in a decrease in the volume level of the audio circuitry 46 to a level as shown in FIG. 5D. Further tilting of the hand-held device 10 in the second direction 70 as shown in FIG. 4E would similarly cause a further decrease in the volume level of the audio circuitry 46. In this manner, controlling the volume level of the audio circuitry 46 may be accomplished by simply tilting a hand-held device 10 at various angles relative to the reference tilt 66. Deactivation of the hand-held device 10 from the volume control mode is performed by depressing the second control button 30 a second time. Upon deactivation, the volume level appearing in the volume indicator window 72 on the display screen 26 defines a new volume level utilized by the audio circuitry 46 thereafter.

In a similar manner, the brightness level of the display screen 26 is controllable by tilting the hand-held device 10 at various angles relative to the reference tilt 66. The display screen 26 is preferably a backlit LCD display. The brightness of the display 26 is controlled by the CCFL circuit 58, namely, by controlling the amount of current flowing in the CCFL circuit 58. Assume that the brightness level of the display 26 is at a first brightness level upon activation of the brightness control mode by depressing the third control button 32 with the hand-held device oriented as shown in FIG. 4A. Upon activation, the reference tilt 66 is established. Tilting the hand-held device 10 at an angle $\theta_1$ in the first direction 68 increases the brightness level of the display 26 to a second level greater than the first level. More specifically, the sensors 36 and 38 sense the angle of tilt $\theta_1$ of the hand-held device 10 and transmit signal 62 and 64 to the CPU 44 indicative of the angle $\theta_1$ in the first direction 68. In response to the signals 62 and 64, the CPU 44, via line 74, controls the control voltage generated by the digital-to-analog converter 60 on line 76. The control voltage generated on the line 76 controls the amount of current flowing in the CCFL circuit 58, which correspondingly controls the brightness of the display 26. Adjusting the level of the control voltage on the line 76 correspondingly adjusts the current flowing in the CCFL circuit 58 resulting in an adjusted brightness level for the display 26. Accordingly, with the hand-held display 10 oriented at the angle $\theta_1$ as shown in FIG. 4B, the CPU 44, responsive to the signal 62,64, controls the digital-to-analog converter 60 to increase the control voltage on the line 76, resulting in increased current flowing in the CCFL circuit 58, further resulting in an increased brightness level of the display 26. Further tilting of the hand-held display 10 in the first direction 68 at an angle $\theta_2$ as shown in FIG. 4C results in a further increase in the brightness level of the display 26 in the same manner as previously described above.

Conversely, shielding the hand-held display 10 in the second direction 70 at an angle $\theta_3$ as shown in FIG. 4D results in a decrease in the brightness level of the display 26. Further tilting of the hand-held display 10 in the second direction 70 at an angle $\theta_4$ as shown in FIG. 4E, results in a further decrease in the brightness level of the display 26. Deactivation of the hand-held device 10 from the brightness control mode is performed by depressing the third control button 32 a second time. The brightness level of the display 26 upon deactivation defines a new brightness level of the display 26 used thereafter. Accordingly, cumbersome buttons and knobs generally utilized to adjust the brightness level of the display 26 are unnecessary.

Figure 6C:
FIGS. 6A–6C are explanatory diagrams illustrating control of zooming associated with the hand-held device according to present invention.
Figure 6A:
Figure 6B:

FIGS. 6A–6C illustrate control of zooming associated with the hand-held device 10. Zooming is a feature which generally increases (zoom in) or decreases (zoom out) the size of content displayed on the display screen 26. Upon activation of the zoom mode by depressing the fourth control button 34, assume that the content displayed in the display screen 26 is as shown in FIG. 6A, and further that the hand-held display 10 is oriented as shown in FIG. 4A. Accordingly, the reference tilt 66 is established. Tilting of the hand-held display 10 in the first direction 68 at the angle $\theta_1$ as shown in FIG. 4B is sensed by the sensors 36 and 38 in the same manner that has been previously described. In response to the signals 62 and 64 indicative of the change in tilt $\theta_1$, the CPU 44 controls the display 26 to zoom in on the content displayed on the display 26 as shown in FIG. 6B. Further tilting of the hand-held display 10 in the first direction 68 at an angle $\theta_2$ as shown in FIG. 4C would further increase the size of the content displayed on the display 26.

Conversely, tilting the hand-held display 10 in the second direction 70 at an angle $\theta_3$ as shown in FIG. 4D is also sensed by the sensors 36 and 38. In response to the signals 62 and 64 indicative of the angle of tilt $\theta_3$, the CPU 44 controls the display 26 to zoom out of the content displayed on the display screen 26 as shown in FIG. 6C. Further tilting of the hand-held display 10 in the second direction 70 at an angle $\theta_4$ as shown in FIG. 4E causes further zooming out of content displayed on the display screen 26. Deactivation of the hand-held device 10 from the zoom mode is performed by depressing the fourth control button 34 a second time. Upon deactivation, the zoomed content displayed on the display screen 26 remains displayed on the display screen 26. Accordingly, various displayed window buttons and other control bars/buttons/icons generally utilized for zooming are unnecessary.

It should be noted that the levels and rates of adjustment to the various parameters discussed herein are exemplary only. A user may program the sensitivity of the hand-held device 10 (the CPU 44 and the sensors 36,38) at the user's discretion. Accordingly, the levels and rates of adjustment of the various parameters corresponding to the changes in the angle of tilt of the hand-held device 10 can be set to a particular user's preference. Further, it should be noted that while control of the various parameters associated with the hand-held device 10 has been described with respect to tilting the hand-held device 10 about the axis 40 in first 68 and second 70 directions, control of the various parameters may also be accomplished by tilting the hand-held 10 about the axis 42 in respective directions 78 and 80, or any combination thereof.

While the invention has been described with particular reference to the drawings, it should be understood that various modifications could be made without departing from the spirit and scope of the present invention.

What is claimed is:

1. A portable display device having a size suitable for hand-held use and including a displaying screen for displaying video images and audio circuitry for providing audio signals to a user, said portable display device comprising:

a manual input device mounted on the portable display device activatable by a user for placing the portable display device in any one of a plurality of modes of operation selected from the group consisting of paging, volume control, brightness control and zoom;

a sensor mounted on the portable display device and configured to sense changes in tilt of the portable display device relative to a reference tilt established upon placing the portable display device in one of the plurality of modes of operation; and a control connected to the sensor and adapted to modify parameters associated with a mode of operation selected from the plurality of modes of operation in response to the sensor sensing tilt changes when the portable display is in the select mode of operation.

2. The portable display device of claim 1, wherein the manual input device comprises pushbutton switches depressible a first time to activate a particular mode of operation and depressible a second time to deactivate the particular mode of operation.

3. The portable display device of claim 2, wherein the push-button switches are mounted at locations on the portable display device engageable by a finger of a user with the portable display device held in the hand of the user.

4. The portable display device of claim 1, wherein the sensor is configured to sense changes in tilt direction of the portable display device relative to the reference tilt and to develop a signal indicative of the sensed changed in tilt direction, and the control is adapted to further modify parameters associated with a mode of operation selected from the plurality of modes of operation in response to the sensor signal indicative of tilt direction changes when the portable display device is in the select mode of operation.

5. The portable display device of claim 4, wherein the portable display device displays windows of video data on the display screen, and wherein with the portable display device in the paging mode the control pages through the windows on the display screen, one at a time, in response to the signal from the sensor indicative of changes in tilt and tilt direction.

6. The portable display device of claim 5, wherein the control pages through the windows on the display screen, one at a time, at a rate proportional to the change in tilt of the portable display device from the reference tilt as sensed by the sensor.

7. The portable display device of claim 6, wherein the control pages forward through the windows on the display screen, one at a time, with the portable display device tilted in a first direction, and the control pages backward through the windows on the display screen, one at a time, with the portable display device tilted in a second direction different from the first direction.

8. The portable display device of claim 5, wherein the windows of video information comprise pages of a document stored in a memory resident within the portable display device.

9. The portable display device of claim 5, wherein the windows of video information comprise pages from different computer applications stored in a memory and controlled by a processor, both resident within the portable display device.

10. The portable display device of claim 6, wherein the window appearing on the display screen upon deactivation of the portable display device from the paging mode remains on the display screen.

11. The portable display device of claim 4, wherein with the portable display device in the volume control mode the control controls a level of volume of the audio signals developed by the audio circuitry in response to the signal from the sensor indicative of changes in tilt and tilt direction.

12. The portable display device of claim 11, wherein the control changes the volume level of the audio signals by an amount proportional to the change in tilt of the portable display device from the reference tilt as sensed by the sensor.

13. The portable display device of claim 12, wherein the control increases the volume level of the audio signals with the portable display device tilted in a first direction, and the control decreases the volume level of the audio signals with the portable display device tilted in a second direction different from the first direction.

14. The portable display device of claim 12, wherein the volume level of the audio signals upon deactivation of the portable display device from the volume control mode defines a new volume level of the audio signals.

15. The portable display device of claim 4, wherein with the portable display device in the brightness control mode the control controls a level of brightness of the display screen in response to the signal from the sensor indicative of changes in tilt and tilt direction.

16. The portable display device of claim 15, wherein the control changes the brightness level of the display screen by an amount proportional to the change in tilt of the portable display device from the reference tilt as sensed by the sensor.

17. The portable display device of claim 16, wherein the control increases the brightness level of the display screen with the portable display device tilted in a first direction, and the control decreases the brightness level of the display screen with the portable display device tilted in a second direction different from the first direction.

18. The portable display device of claim 16, wherein the brightness level of the display screen upon deactivation of the portable display device from the brightness control mode defines a new brightness level of the display screen.

19. The portable display device of claim 15, wherein the display screen comprises a backlit liquid crystal display.

20. The portable display device of claim 4, wherein with the portable display device in the zoom mode the control controls zooming on content displayed on the display screen in response to the signal from the sensor indicative of changes in tilt and tilt direction.

21. The portable display device of claim 20, wherein the control changes the zooming on content displayed on the display screen by an amount proportional to the change in tilt of the portable display device from the reference tilt as sensed by the sensor.

22. The portable display device of claim 21, wherein the control zooms in on content displayed on the display screen with the portable display device tilted in a first direction, and the control zooms out on content displayed on the display screen with the portable display device tilted in a second direction different from the first direction.

23. The portable display device of claim 21, wherein the zoomed content displayed on the display screen upon deactivation of the portable display device from the zoom mode remains displayed on the display screen.

24. A portable display device having a size suitable for hand-held use including a display screen for displaying various windows of video data on a display screen, said portable display device comprising:

a manual input device mounted on the portable display device activatable by a user for placing the portable display device in a paging mode;

a sensor mounted on the portable display device and configured to sense changes in tilt of the portable display device relative to a reference tilt established upon placing the portable display device in the paging mode and to transmit a signal indicative of the sensed changes in tilt; and a control adapted to page through the various windows on the display screen, one at a time, in response to the signal from the sensor indicative of changes in tilt when the portable display device is in the paging mode.

25. The portable display device of claim 24, wherein the control is configured to page through the various windows at a rate proportional to the change in tilt of the portable display device from the reference tilt as sensed by the sensor with the portable display device in the paging mode.

26. The portable display device of claim 24, wherein the manual input device comprises a pushbutton switch depressible a first time to activate paging and depressible a second time to deactivate paging, wherein the window appearing on the display screen upon paging deactivation remains on the display screen.

27. The portable display device of claim 24, wherein the sensor is configured to sense changes in tilt direction of the portable display device relative to the reference tilt and to transmit the signal indicative of the sensed change in tilt direction, the control is configured to page forward through the various windows in response to the signal from the sensor indicating the portable display device being tilted in a first direction, and the control is configured to page backward through the various windows in response to the signal from the sensor indicating the portable display device being tilted in a second direction different from the first direction.

28. The portable display device of claim 26, wherein the pushbutton switch is mounted at a location on the portable display device engageable by a finger of a user with the portable display device held in a hand of the user.

29. The portable display device of claim 24, wherein the various windows of video information comprise pages of a document stored in a memory resident within the portable display device.

30. The portable display device of claim 24, wherein the various windows of video information comprise pages from different computer applications stored in a memory and controlled by a processor, both resident within the portable display device.

31. A portable display device having a size suitable for hand-held use including audio circuitry for generating audio signals, said portable display device comprising:

a manual input device mounted on the portable display device activatable by a user for placing the portable display device in a volume control mode;

a sensor mounted on the portable display device and configured to sense changes in tilt of the portable display device relative to a reference tilt established upon placing the portable display device in the volume control mode and to transmit a signal indicative of the sensed changes in tilt; and a control adapted to control volume level of the audio circuitry in response to the signal from the sensor indicative of changes in tilt when the portable display device is in the volume control mode.

32. The portable display device of claim 31, wherein the control changes the volume level of the audio circuitry by an amount proportional to the change in tilt of the portable display device from the reference tilt as sensed by the sensor with the portable display device in the volume control mode.

33. The portable display device of claim 31, wherein the manual input device comprises a pushbutton switch depressible a first time to activate volume control and depressible a second time to deactivate volume control, wherein the volume level of the audio circuitry upon volume control deactivation defines a new volume level of the audio signals.

34. The portable display device of claim 31, wherein the sensor is configured to sense changes in tilt direction of the portable display device relative to the reference tilt and to transmit the signal indicative of the sensed change in tilt direction, the control is configured to increase the volume level of the audio signals in response to the signal from the sensor indicating the portable display device being tilted in a first direction, and the control is configured to decrease the volume level of the audio signals in response to the signal from the sensor indicating the portable display device being tilted in a second direction different from the first direction.

35. The portable display device of claim 33, wherein the pushbutton switch is mounted at a location on the portable display device engageable by a finger of a user with the portable display device held in a hand of the user.

36. A portable display device having a size suitable for hand-held use including a backlit display screen, said portable display device comprising:

a manual input device mounted on the portable display device activatable by a user for placing the portable device in a brightness control mode;

a sensor mounted on the portable display device and configured to sense changes in tilt of the portable display device relative to a reference tilt established upon placing the portable display device in the brightness control and to transmit a signal indicative of the sensed changes in tilt; and a control adapted to control brightness of the display screen in response to the signal from the sensor indicative of changes in tilt when the portable display device is in the brightness control mode.

37. The portable display device of claim 36, wherein the control changes the brightness of the display screen by an amount proportional to the change in tilt of the portable display device from the reference tilt as sensed by the sensor with the portable display device in the brightness control mode.

38. The portable display device of claim 36, wherein the manual input device comprises a pushbutton switch depressible a first time to activate brightness control and depressible a second time to deactivate brightness control, wherein the brightness of the display screen upon brightness control deactivation defines a new brightness of the display screen.

39. The portable display device of claim 36, wherein the sensor is configured to sense changes in tilt direction of the portable display device relative to the reference tilt and to transmit the signal indicative of the sensed change in tilt direction, the control is configured to increase the brightness of the display screen in response to the signal from the sensor indicating the portable display device being tilted in a first direction, and the control is configured to decrease the brightness of the display screen in response to the signal from the sensor indicating the portable display device being tilted in a second direction different from the first direction.

40. The portable display device of claim 36, wherein the display screen comprises a backlit liquid crystal display.

41. The portable display device of claim 38, wherein the pushbutton switch is mounted at a location on the portable display device engageable by a finger of a user with the portable display device held in a hand of the user.

42. A portable display device having a size suitable for hand-held use including a display screen, said portable display device comprising:

a manual input device mounted on the portable display device activatable by a user for placing the portable display device in a zoom mode;

a sensor mounted on the portable display device and configured to sense changes in tilt of the portable display device relative to a reference tilt established upon placing the portable display device in the zoom mode and to transmit a signal indicative of the sensed changes in tilt; and a control adapted to control zooming on content displayed on the display screen in response to the signal from the sensor indicative of changes in tilt when the portable display device is in the zoom mode.

43. The portable display device of claim 42, wherein the control changes the zooming on content displayed on the display screen by an amount proportional to the change in tilt of the portable display device from the reference tilt as sensed by the sensor with the portable display device in the zoom mode.

44. The portable display device of claim 42, wherein the manual input device comprises a pushbutton switch depressible a first time to activate zooming and depressible a second time to deactivate zooming, wherein the zoomed content displayed on the display screen upon zooming deactivation remains displayed on the display screen.

45. The portable display device of claim 42, wherein the sensor is configured to sense changes in tilt direction of the portable display device relative to the reference tilt and to transmit the signal indicative of the sensed change in tilt direction, the control is configured to zoom in on content displayed on the display screen in response to the signal from the sensor indicating the portable display device being tilted in a first direction, and the control is configured to zoom out on content displayed on the display screen in response to the signal from the sensor indicating the portable display device being tilted in a second direction different from the first direction.

46. The portable display device of claim 44, wherein the pushbutton switch is mounted at a location on the portable display device engageable by a finger of a user with the portable display device held in a hand of the user.

* * * * *